United States Patent
Wang et al.

(10) Patent No.: US 12,060,447 B2
(45) Date of Patent: Aug. 13, 2024

(54) PHOTOCHROMIC RESIN LENS WITH REFRACTIVITY OF 1.50 AND PREPARATION METHOD THEREOF

(71) Applicants: Jiangsu Conant Optical Co., Ltd., Nantong (CN); Shanghai Conant Optical Co., Ltd., Shanghai (CN)

(72) Inventors: Chuanbao Wang, Nantong (CN); Qingbo Yan, Nantong (CN); Tianniao Huang, Nantong (CN); Yang Li, Nantong (CN)

(73) Assignees: Jiangsu Conant Optical Co., Ltd., Nantong (CN); Shanghai Conant Optical Co., Ltd., Shanghai (CN)

( * ) Notice: Subject to any disclaimer, the term of this patent is extended or adjusted under 35 U.S.C. 154(b) by 429 days.

(21) Appl. No.: 17/243,339

(22) Filed: Apr. 28, 2021

(65) Prior Publication Data

US 2021/0269569 A1 Sep. 2, 2021

Related U.S. Application Data

(63) Continuation-in-part of application No. PCT/CN2020/088779, filed on May 6, 2020.

(30) Foreign Application Priority Data

Feb. 28, 2020 (CN) .......................... 202010130125.1

(51) Int. Cl.
| | |
|---|---|
| *C08F 218/08* | (2006.01) |
| *C08F 220/14* | (2006.01) |
| *C08F 220/18* | (2006.01) |
| *C08F 222/10* | (2006.01) |
| *G02B 1/04* | (2006.01) |
| *G02C 7/10* | (2006.01) |

(52) U.S. Cl.
CPC ........ *C08F 222/102* (2020.02); *C08F 218/08* (2013.01); *C08F 220/14* (2013.01); *C08F 220/1803* (2020.02); *C08F 220/1808* (2020.02); *C08F 222/104* (2020.02); *G02B 1/041* (2013.01); *G02C 7/102* (2013.01)

(58) Field of Classification Search
CPC .................. C08F 218/08; C08F 220/14; C08F 220/1803; C08F 220/1808; C08F 222/102; C08F 222/104; G02C 7/102; G02B 1/041

See application file for complete search history.

(56) References Cited

U.S. PATENT DOCUMENTS

| | | | | |
|---|---|---|---|---|
| 5,914,174 A | * | 6/1999 | Gupta ...................... | C09D 4/00 359/321 |
| 2009/0318619 A1 | * | 12/2009 | Berzon .................... | C09D 4/00 525/8 |
| 2013/0015416 A1 | * | 1/2013 | Takenaka .................. | C08F 2/44 252/582 |

FOREIGN PATENT DOCUMENTS

| | | | | | |
|---|---|---|---|---|---|
| CN | 106905455 A | * | 6/2017 | ............ | C08F 118/00 |
| JP | 2008222884 A | * | 9/2008 | ............ | C08F 220/38 |

\* cited by examiner

*Primary Examiner* — Bijan Ahvazi
(74) *Attorney, Agent, or Firm* — CBM PATENT CONSULTING, LLC

(57) ABSTRACT

The present invention discloses a photochromic resin lens with a refractivity of 1.50 and a preparation method thereof. The lens comprises a resin monomer, a photochromic organic material, an initiator, an antioxidant and a photo stabilizer at a weight ratio of 100:0.01-0.1:1-10:0.1-0.9:0.1-0.9. The resin monomer is a mixture of a monofunctional acrylate, a difunctional acrylate and a tetrafunctional acrylate at a weight ratio of 10-80:10-50:10-50. In the present invention, a low-refractivity photochromic resin lens with a refractivity of 1.50 and an Abbe number of 58 is prepared. The lens does not contain toxic materials, is safer and more environmentally friendly to wear and produce, and has high Abbe number, clear imaging, high visible light transmittance, and high product pass rate. The visible light transmittance under UV irradiation is less than 20%, the color is deep, and the photochromic effect is good.

7 Claims, No Drawings

PHOTOCHROMIC RESIN LENS WITH REFRACTIVITY OF 1.50 AND PREPARATION METHOD THEREOF

This application is the continuation-in-part application of the International Application No. PCT/CN2020/088779 filed on 6 May 2020 which designated the U.S. and claims priority to Chinese Application No. CN202010130125.1 filed on 28 Feb. 2020, the entire contents of each of which are hereby incorporated by reference.

BACKGROUND

Technical Field

The present invention relates to the field of resin lenses, and more specifically to a photochromic resin lens with a refractivity of 1.50 and a preparation method thereof.

Related Art

Photochromic resin lens is also known as "photosensitive lens". According to the principle of reversible light and color interconversion, the lens quickly darkens under the irradiation of light and ultraviolet rays to block strong light and absorb ultraviolet rays, but have a neutral absorption to visible light; and when back to a dark place, it can quickly return to a colorless and transparent state, ensuring the light transmittance of the lens. Therefore, the photochromic lens is suitable for both indoor and outdoor use to protect the eyes against harm from the sun, ultraviolet rays, and dazzling light.

At present, two technologies are available for manufacturing photochromic resin lenses. One is surface coating, which can achieve photochromism on the surface of lenses of high, medium, and low refractivity. The other is to mix a photochromic dye with a lens monomer, and then heat and cure them to form a lens with photochromic function. Currently, resin lenses with a refractivity of 1.56 largely dominate the sales market. The main raw materials of resin lenses with a refractivity of 1.56 include a multifunctional acrylate and styrene in which a photochromic powder is dissolved. The refractivity of the cured lens is about 1.545 and the Abbe number is about 41. Consumers in European and American countries do not prefer resin lenses with a refractivity of 1.56 due to the low Abbe number, and one of the raw materials is a bisphenol A-type acrylate, which is a low-toxicity chemical.

SUMMARY

To overcome the above shortcomings, an object of the present invention is to provide a photochromic resin lens with a refractivity of 1.50, a high Abbe number, a clear imaging ability, a good photochromic effect, and high safety and environmental protection during wearing, and a preparation method thereof.

To achieve the above object, the present invention provides a photochromic resin lens with a refractivity of 1.50, which comprises a resin monomer, a photochromic organic material, an initiator, an antioxidant and a photo stabilizer at a weight ratio of 100:0.01-0.1:1-10:0.1-0.9:0.1-0.9. The resin monomer is a mixture of a monofunctional acrylate, a difunctional acrylate and a tetrafunctional acrylate at a weight ratio of 10-80:10-50:10-50.

The resin monomer, photochromic organic material, initiator, antioxidant, and photo stabilizer contained in the photochromic resin lens with a refractivity of 1.50 according to the present invention preferably have a weight ratio of 100:0.01-0.08:1-5:0.1-0.5:0.1-0.5, where the resin monomer is a mixture of a monofunctional acrylate, a difunctional acrylate, and a tetrafunctional acrylate at a weight ratio of preferably 30-60:20-40:20-40.

In the present invention, the monofunctional acrylatere has a refractivity $N_d$ of 1.42 or less, and the difunctional acrylate and tetrafunctional acrylate have a refractivity $N_d$ of 1.48 or less.

The monofunctional acrylate is one or more of methyl methacrylate, vinyl acetate, methyl laurate, and isooctyl acrylate.

The bifunctional acrylate is one or more of polyethylene glycol di(meth)acrylate, tripropylene glycol diacrylate, diethylene glycol diacrylate, polypentylene glycol di(meth)acrylate, neopentyl glycol diacrylate and 1,9-nonanediol diacrylate.

The tetrafunctional acrylate is one or more of di(trimethylolpropane) tetraacrylate, pentaerythritol tetraacrylate, di(trimethylolpropane) tetraacrylate, ethoxylated pentaerythritol tetraacrylate, and dipentaerythritol pentaacrylate.

The photochromic organic material is one or two of spiropyrans and spirooxazines.

The initiator is an azo initiator, preferably azobisisobutyronitrile or azobisisoheptonitrile.

The antioxidant is one or more of N,N'-bis[β-(3,5-di-tert-butyl-4-hydroxyphenyl)propionyl]hydrazine, N,N'-bis-(3-(3,5-di-tert-butyl-4-hydroxyphenyl)propionyl)hexamethylene diamine, n-octadecyl β-(3,5-di-tert-butyl-4-hydroxyphenyl)propionate, isooctyl β-(3,5-di-tert-butyl-4-hydroxyphenyl)propionate, 1,3,5-tris(3,5-di-tert-butyl-4-hydroxybenzyl)isocyanuric acid; and the photo stabilizer is one or more of bis(2,2,6,6-tetramethyl-4-piperidinyl)sebacate, a polymer of N,N'-bis-(2,2,6,6-tetramethyl-4-piperidinyl)-1,6-hexamethylene diamine with 2,4,6-trichloro-1,3,5-triazine, and poly {[(6-1,1,3,3,-tetramethylbutyl)amino]-S-tribromo-2,4-diyl}.

A method for preparing a photochromic resin lens with a refractivity of 1.50 comprises the following steps:

(1) mixing of materials, comprising: weighing a resin monomer, a photochromic organic material, an initiator, an antioxidant, and a photo stabilizer in proportion and mixing uniformly, where the photochromic organic material is firstly added to the monofunctional acrylate, and mixed well by magnetically stirring to form a photochromic solution for use; and then dissolving the antioxidant and the photo stabilizer uniformly in remaining monofunctional acrylate in proportion, next adding other acrylate monomers and the photochromic solution, adding the initiator after complete dissolution, and mixing well;

(2) pouring of materials, comprising: pouring the uniformly mixed materials in the step (1) into a glass mold through a 1 μm filter, and sealing with a tape;

(3) primary heat curing, comprising: setting the initial temperature to 30-35° C., heating up to 35-40° C. over 1 hr, then heating up to 40-45° C. over 1 hr and holding for 6 hrs, next heating up to 50-55° C. over 6.5 hrs and holding for 1 hr, heating up to 85-95° C. over 2.5 hrs and holding for 2 hrs, and then cooling down to 70-50° C. over 1 hr, where the temperature rises and falls at a constant rate;

(4) releasing from the mold, edging, and washing; and (5) secondary heat curing, comprising: performing the secondary heat curing at 100° ° C. for 2 hrs.

Compared with the prior art, the present invention has the following beneficial effects. In the present invention, a particular resin monomer is used, which is useful as a solvent to dissolve the photochromic organic material and also participates in the reaction. A specific refractivity requirement is met, and low-refractivity resin lenses with a refractivity of 1.50 and an Abbe number of 58 can be prepared. The lens does not contain toxic materials, is safer and more environmentally friendly to wear and produce, and has high Abbe number, clear imaging, high visible light transmittance, and high product pass rate. The visible light transmittance under UV irradiation is less than 20%, the color is deep, and the photochromic effect is good.

DETAILED DESCRIPTION

Preferred embodiments of the present invention will be described in further detail below in conjunction with specific examples.

Example 1

Monofunctional acrylate: Methyl methacrylate (Degussa)
Difunctional acrylate: Polyethylene glycol di(meth)acrylate (Hannon)
Tetrafunctional acrylate: Di(trimethylolpropane) tetraacrylate (Hannon)
Photochromic organic material: Spiropyran (Vivimed)
Initiator: Azobisisobutyronitrile (Jinan Jieao Chemical Co., Ltd.)
Antioxidant: N,N'-bis[β-(3,5-di-tert-butyl-4-hydroxyphenyl)propionyl]hydrazine (Antioxidant 1024 from Nanjing Jingtianwei Chemical Co., Ltd.)
Photo stabilizer: bis(2,2,6,6-tetramethyl-4-piperidinyl)sebacate (Photo stabilizer 770 from Nanjing Jingtianwei Chemical Co., Ltd.)

A photochromic resin lens with a refractivity of 1.50 comprises 10 kg of a resin monomer (3.4 kg of a monofunctional acrylate, 3.3 kg of a difunctional acrylate, and 3.3 kg of a tetrafunctional acrylate), 2 g of a photochromic organic material, 100 g of an initiator, 10 g of an antioxidant and 10 g of a photo stabilizer.

The method for preparing the lens comprises the following steps.

(1) Mixing of materials: The photochromic organic material was added to the monofunctional acrylate, and mixed well by magnetically stirring to form a photochromic solution for use. The antioxidant and the photo stabilizer were uniformly dissolved in remaining monofunctional acrylate in proportion, next other acrylate monomers and the photochromic solution were added, and the initiator was added after complete dissolution, and mixed well.

(2) Pouring of materials: The uniformly mixed materials in the step (1) were poured into a glass mold through a 1 μm filter, and sealed with a tape.

(3) Primary heat curing: The initial temperature was set to 30-35° C., heated up to 35-40° C. over 1 hr, then heated up to 40-45° C. over 1 hr and held for 6 hrs, next heated up to 50-55° C. over 6.5 hrs and held for 1 hr, heated up to 85-95° C. over 2.5 hrs and held for 2 hrs, and then cooled down to 70-50° ° C. over 1 hr, where the temperature rise and fall were at a constant rate.

(4) The material was released from the mold, edged, and washed.

(5) Secondary heat curing: The secondary heat curing was carried out at 100° C. for 2 hrs.

Example 2

Monofunctional acrylate: Vinyl acetate (Zhen Shanghai and Shanghai Industrial Co., Ltd.)
Difunctional acrylate: Tripropylene glycol diacrylate (Eternal Material Co., Ltd)
Tetrafunctional acrylate: Pentaerythritol tetraacrylate (Eternal Material Co., Ltd)
Photochromic organic material: Spirooxazine (Vivimed)
Initiator: Azobisisobutyronitrile (Jinan Jieao Chemical Co., Ltd.)
Antioxidant: N,N'-bis-(3-(3,5-di-tert-butyl-4-hydroxyphenyl)propionyl)hexamethylene diamine (Antioxidant 1098 from Nanjing Jingtianwei Chemical Co., Ltd.)
Photo stabilizer: Poly{[(6-1,1,3,3,-tetramethylbutyl)amino]-S-tribromo-2,4-diyl} (Photo stabilizer 783 from Nanjing Jingtianwei Chemical Co., Ltd.)

A photochromic resin lens with a refractivity of 1.50 comprises 10 kg of a resin monomer (5 kg of a monofunctional acrylate, 2.5 kg of a difunctional acrylate, and 2.5 kg of a tetrafunctional acrylate), 5 g of a photochromic organic material, 400 g of an initiator, 40 g of an antioxidant and 30 g of a photo stabilizer.

The method for preparing the lens comprises the following steps.

(1) Mixing of materials: The photochromic organic material was added to the monofunctional acrylate, and mixed well by magnetically stirring to form a photochromic solution for use. The antioxidant and the photo stabilizer were uniformly dissolved in remaining monofunctional acrylate in proportion, next other acrylate monomers and the photochromic solution were added, and the initiator was added after complete dissolution, and mixed well.

(2) Pouring of materials: The uniformly mixed materials in the step (1) were poured into a glass mold through a 1 μm filter, and sealed with a tape.

(3) Primary heat curing: The initial temperature was set to 30-35° C., heated up to 35-40° C. over 1 hr, then heated up to 40-45° C. over 1 hr and held for 6 hrs, next heated up to 50-55° C. over 6.5 hrs and held for 1 hr, heated up to 85-95° C. over 2.5 hrs and held for 2 hrs, and then cooled down to 70-50° ° C. over 1 hr, where the temperature rise and fall were at a constant rate.

(4) The material was released from the mold, edged, and washed.

(5) Secondary heat curing: The secondary heat curing was carried out at 100° C. for 2 hrs.

Example 3

Monofunctional acrylate: Isooctyl acrylate (Shanghai Rhawn Chemical Technology Co., Ltd.)
Difunctional acrylate: Diethylene glycol diacrylate (Hannon)
Tetrafunctional acrylate: Ditrimethylolpropane tetraacrylate (Eternal Material Co., Ltd)
Photochromic organic material: Spiropyran (Vivimed)
Initiator: Azobisisoheptonitrile (Jinan Jieao Chemical Co., Ltd.)
Antioxidant: n-octadecyl β-(3,5-di-tert-butyl-4-hydroxyphenyl)propionate (Antioxidant 1076 from Jiangxi Lotchemo Co., Ltd)

Photo stabilizer: bis(2,2,6,6-tetramethyl-4-piperidinyl)sebacate (Photo stabilizer 770 from Jiangxi Lotchemo Co., Ltd)

A photochromic resin lens with a refractivity of 1.50 comprises 10 kg of a resin monomer (4 kg of a monofunctional acrylate, 3 kg of a difunctional acrylate, and 3 kg of a tetrafunctional acrylate), 10 g of a photochromic organic material, 1 kg of an initiator, 90 g of an antioxidant and 90 g of a photo stabilizer.

The method for preparing the lens comprises the following steps.

(1) Mixing of materials: The photochromic organic material was added to the monofunctional acrylate, and mixed well by magnetically stirring to form a photochromic solution for use. The antioxidant and the photo stabilizer were uniformly dissolved in remaining monofunctional acrylate in proportion, next other acrylate monomers and the photochromic solution were added, and the initiator was added after complete dissolution, and mixed well.

(2) Pouring of materials: The uniformly mixed materials in the step (1) were poured into a glass mold through a 1 μm filter, and sealed with a tape.

(3) Primary heat curing: The initial temperature was set to 30-35° C., heated up to 35-40° C. over 1 hr, then heated up to 40-45° C. over 1 hr and held for 6 hrs, next heated up to 50-55° C. over 6.5 hrs and held for 1 hr, heated up to 85-95° C. over 2.5 hrs and held for 2 hrs, and then cooled down to 70-50° C. over 1 hr, where the temperature rise and fall were at a constant rate.

(4) The material was released from the mold, edged, and washed.

(5) Secondary heat curing: The secondary heat curing was carried out at 100° ° C. for 2 hrs.

Comparative Example 1

A photochromic resin lens with a refractivity of 1.56 comprises 10 kg of a resin monomer (2 kg of styrene, 2.2 kg of a bisphenol A difunctional acrylate, 2.1 kg of a non-bisphenol A difunctional acrylate, 2.7 kg of a trifunctional acrylate, and 0.9 kg of a tetrafunctional acrylate), and 5 g of a chain transfer agent bromotrichloromethane. The species, amount and preparation method of other raw materials are the same as those in Example 1.

Comparative Example 2

A photochromic resin lens comprises 10 kg of a resin monomer (5 kg of a difunctional acrylate, and 5 kg of a tetrafunctional acrylate), 2 g of a photochromic organic material, 100 g of an initiator, 10 g of an antioxidant and 10 g of a photo stabilizer. The species and preparation method of raw materials are the same as those in Example 1.

Comparative Example 3

A photochromic resin lens comprises 10 kg of a resin monomer (5 kg of a monofunctional acrylate, and 5 kg of a difunctional acrylate), 2 g of a photochromic organic material, 100 g of an initiator, 10 g of an antioxidant and 10 g of a photo stabilizer. The species and preparation method of raw materials are the same as those in Example 1.

Comparative Example 4

A photochromic resin lens comprises 10 kg of a resin monomer (3.4 kg of a monofunctional acrylate, 3.3 kg of a difunctional acrylate, and 3.3 kg of a tetrafunctional acrylate), 2 g of a photochromic organic material, 100 g of an initiator, 10 g of an antioxidant and 10 g of a photo stabilizer. The monofunctional acrylate is o-phenylphenoxy ethyl acrylate (refractivity: 1.528), the difunctional acrylate is 3-(ethoxy)bisphenol A diacrylate (refractivity: 1.540), and the tetrafunctional acrylate is dipentaerythritol hexamethacrylate (refractivity: 1.486). The preparation method is the same as that in Example 1.

Comparative Example 5

A photochromic resin lens comprises 10 kg of a resin monomer (3.4 kg of a monofunctional acrylate, 3.3 kg of a difunctional acrylate, and 3.3 kg of a tetrafunctional acrylate), 15 g of a photochromic organic material, 1.5 kg of an initiator, 100 g of an antioxidant and 100 g of a photo stabilizer. The species and preparation method of raw materials are the same as those in Example 1.

Comparative Example 6

A photochromic resin lens is provided, in which the species and amount of raw materials are the same as those in Example 1, and the preparation method includes the following steps:

(1) Mixing of materials: The photochromic organic material was added to the monofunctional acrylate, and mixed well by magnetically stirring to form a photochromic solution for use. The antioxidant and the photo stabilizer were uniformly dissolved in remaining monofunctional acrylate in proportion, next other acrylate monomers and the photochromic solution were added, and the initiator was added after complete dissolution, and mixed well.

(2) Pouring of materials: The uniformly mixed materials in the step (1) were poured into a glass mold through a 1 μm filter, and sealed with a tape.

(3) Primary heat curing: The initial temperature was set to 30-35° C., heated up to 40-45° C. over 1 hr, then heated up to 50-55° C. over 1 hr and held for 6 hrs, next heated up to 60-65° C. over 6.5 hrs and held for 1 hr, heated up to 80-85° C. over 2.5 hrs and held for 2 hrs, and then cooled down to 70-50° ° C. over 1 hr, where the temperature rise and fall were at a constant rate.

(4) The material was released from the mold, edged, and washed.

(5) Secondary heat curing: The secondary heat curing was carried out at 100° ° C. for 2 hrs.

Table 1 shows the performance comparison of the lenses described in the above examples and comparative examples.

TABLE 1

Performance comparison of the lenses in each example and comparative example

| | Refractivity | Abbe number | Visible light transmittance | Visible light transmittance under ultraviolet light irradiation | Lens pass rate | Hardness |
|---|---|---|---|---|---|---|
| Example 1 | 1.502 | 57.2 | 89.2% | 25.6% | 91.8% | 30 |
| Example 2 | 1.503 | 57.5 | 90.1% | 19.2% | 93.5% | 31 |
| Example 3 | 1.504 | 56.5 | 89.7% | 15.2% | 92.1% | 29 |
| Comparative Example 1 | 1.545 | 39.1 | 89.5% | 25.6% | 91.2% | 25 |

TABLE 1-continued

Performance comparison of the lenses in each example and comparative example

| | Refractivity | Abbe number | Visible light transmittance | Visible light transmittance under ultraviolet light irradiation | Lens pass rate | Hardness |
|---|---|---|---|---|---|---|
| Comparative Example 2 | 1.515 | 54.5 | 87.6% | 25.6% | 60.5% | 26 |
| Comparative Example 3 | 1.501 | 56.8 | 88.2% | 25.6% | 55.0% | 35 |
| Comparative Example 4 | 1.525 | 55.2 | 88.5% | 25.6% | 75.3% | 29 |
| Comparative Example 5 | 1.506 | 56.7 | 88.3% | 13.5% | 10.3% | 38 |
| Comparative Example 6 | 1.502 | 57.2 | 89.2% | 25.6% | 73.5% | 30 |

Note: The refractivity and Abbe number test equipment is Abbe refractometer, the visible light transmittance test equipment is TM-3 spectrometer, and the hardness test equipment is Barcol hardness tester. The qualified lens in the table only means that the lens is not broken when released from the mold, and no spots, scratches, profiles, junks, burrs, cracked edges exist.

Note: A refractivity of 1.56 refers to lenses with a refractivity in the range of 1.545-1.550, and a refractivity of 1.50 refers to lenses with a refractivity of 1.50±0.005; and Abbe number within the range of 58±5% is regarded as an Abbe number of 58.

According to the data in Table 1, the lens prepared in the examples of the present invention has a refractivity of 1.50, a high Abbe number, a high visible light transmittance, and a low visible light transmittance under ultraviolet light irradiation. That is, the photochromic effect is good and the lens pass rate is high. Comparative Example 1 provides a lens with a refractivity of 1.56, but an Abbe number that is much lower than that of the lens in the present invention, and a hardness that is also lower than that of the lens in the present invention. From Comparative Examples 2, 3, 4 and 5, it can be seen that varying the monomer type or the mixing ratio of raw materials will greatly reduce the lens pass rate. From Comparative Example 6, it can be known that changing the preparation method will also lead to a decrease in the lens pass rate. Through the examples and comparative examples, it can also be seen that different raw materials will have an impact on each other. While ensuring the improvement of a certain additive on its own performance, it is also necessary to pay attention to whether it has an impact on other properties.

What is claimed is:

1. A photochromic resin lens with a refractive index of 1.50, comprising a resin monomer, a photochromic organic material, an initiator, an antioxidant and a photo stabilizer at a weight ratio of 100:0.01-0.1:1-10:0.1-0.9:0.1-0.9, wherein the resin monomer is a mixture of a monofunctional acrylate, a difunctional acrylate and a tetrafunctional acrylate at a weight ratio of 10-80:10-50:10-50, the monofunctional acrylate has a refractivity $N_d$ of 1.42 or less, and the difunctional acrylate and tetrafunctional acrylate have a refractivity $N_d$ of 1.48 or less, the initiator is azobisisobutyronitrile or azobisisoheptonitrile; wherein the photochromic resin lens with the refractive index of 1.50 has Abbe number of 58;

wherein the photochromic resin lens is prepared by the following steps:
i) mixing the resin monomer, the photochromic organic material, the initiator, the antioxidant, and the photo stabilizer to obtaining a mixture;
ii) pouring the mixture into a glass mold through a filter, and sealing;
iii) setting the glass mold at temperature of 30-35° C., heating up to 35-40° C. over 1 hour, heating up to 40-45°C over 1 hour and holding for 6 hours, and heating up to 50-55°C over 6.5 hours and holding for 1 hour, then heating up to 85-95° C. over 2.5 hours and holding for 2 hours, and finally cooling down to 70-50° C. over 1 hour;
iv) releasing the mixture from the glass mold, edging, and washing; and
v) heating the mixture at 100° C. for 2 hours, cooling down to room temperature and obtaining the photochromic resin lens.

2. The photochromic resin lens according to claim 1, wherein the resin monomer, the photochromic organic material, the initiator, the antioxidant, and the photo stabilizer contained in lens have a weight ratio of 100:0.01-0.08:1-5:0.1-0.5:0.1-0.5; and the resin monomer is a mixture of a monofunctional acrylate, a difunctional acrylate, and a tetrafunctional acrylate at a weight ratio of 30-60:20-40:20-40.

3. The photochromic resin lens according to claim 1, wherein the monofunctional acrylate is one or more of methyl methacrylate, vinyl acetate, methyl laurate, and isooctyl acrylate.

4. The photochromic resin lens according to claim 1, wherein the bifunctional acrylate is one or more of polyethylene glycol di(meth)acrylate, tripropylene glycol diacrylate, diethylene glycol diacrylate, polypentylene glycol di(meth)acrylate, neopentyl glycol diacrylate and 1,9-nonanediol diacrylate.

5. The photochromic resin lens according to claim 1, wherein the tetrafunctional acrylate is one or more of di(trimethylolpropane) tetraacrylate, pentaerythritol tetraacrylate, di(trimethylolpropane) tetraacrylate, ethoxylated pentaerythritol tetraacrylate, and dipentaerythritol pentaacrylate.

6. The photochromic resin lens according to claim 1, wherein the photochromic organic material is one or two of spiropyrans and spirooxazines.

7. The photochromic resin lens according to claim 1, wherein the antioxidant is one or more of N,N'-bis[β-(3,5-di-tert-butyl-4-hydroxyphenyl)propionyl]hydrazine, N,N'-bis-(3-(3,5-di-tert-butyl-4-hydroxyphenyl)propionyl)hexamethylene diamine, n-octadecyl β-(3,5-di-tert-butyl-4-hydroxyphenyl)propionate, isooctanol β-(3,5-di-tert-butyl-4-hydroxyphenyl)propionate, and 1,3,5-tris(3,5-di-tert-butyl-4-hydroxybenzyl)isocyanuric acid; and the photo stabilizer is one or more of bis(2,2,6,6-tetramethyl-4-piperidinyl)sebacate, and poly{[(6-1,1,3,3,-tetramethylbutyl)amino]-S-tribromo-2,4-diyl}.

* * * * *